(12) United States Patent
Prins et al.

(10) Patent No.: US 6,961,167 B2
(45) Date of Patent: Nov. 1, 2005

(54) DISPLAY DEVICE BASED ON FRUSTRATED TOTAL INTERNAL REFLECTION

(75) Inventors: Menno Willem Jose Prins, Eindhoven (NL); Hugo Johan Cornelissen, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 61 days.

(21) Appl. No.: 10/479,360

(22) PCT Filed: Jun. 4, 2002

(86) PCT No.: PCT/IB02/02041

§ 371 (c)(1),
(2), (4) Date: Dec. 2, 2003

(87) PCT Pub. No.: WO02/099527

PCT Pub. Date: Dec. 12, 2002

(65) Prior Publication Data
US 2004/0160684 A1 Aug. 19, 2004

(30) Foreign Application Priority Data
Jun. 5, 2001 (EP) .................................. 01202127

(51) Int. Cl.[7] .......................... G02F 1/07; G02B 26/02; G02B 5/06

(52) U.S. Cl. ..................... 359/253; 359/228; 359/832
(58) Field of Search ................................. 359/228, 245, 359/250, 252, 253, 263, 290, 295, 296, 297, 359/529, 530, 619, 621, 625, 832; 345/48, 345/55, 84, 85, 107; 349/86, 89; 430/32, 430/34, 35

(56) References Cited

U.S. PATENT DOCUMENTS 6,449,081 B1 * 9/2002 Onuki et al. ................. 359/245
6,819,471 B2 * 11/2004 Amundson et al. ......... 359/296

OTHER PUBLICATIONS

Michele A. Mossman et al., "New Reflective Display Based on Total Internal Reflection In Prismatic Microstructures" Proc. 20th IDRC conference, pp.311-314 (2000).

* cited by examiner

Primary Examiner—Georgia Epps
Assistant Examiner—William Choi

(57) ABSTRACT

Pixels of a display device include a reservoir containing two immiscible fluids. Switching of a pixel state is based on redistribution of the fluids within the reservoir due to electrostatic forced applied onto electrodes, and a potential applied to one of the fluids which is electrically conducting.

20 Claims, 3 Drawing Sheets

DISPLAY DEVICE BASED ON FRUSTRATED TOTAL INTERNAL REFLECTION

Figure 1A:
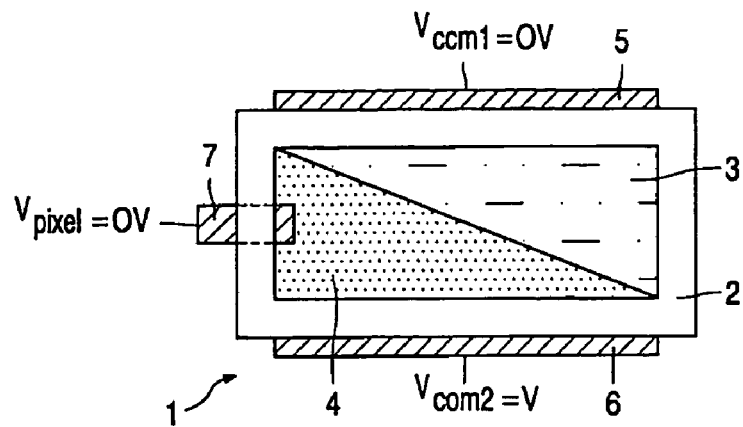

The invention relates to a display device comprising a substantially transparent substrate having a substantially flat surface and a substantially prismatic surface facing said flat surface.

A display device of this type is described in, for example, the article in "New Reflective Display Based on Total Internal Reflection in Prismatic Microstructures" Proc. 20th IDRC conference, pp. 311–314 (2000). This article describes the principle of total internal reflection based on controlled frustration. The total internal reflection is made impossible in one state by moving light-absorbing particles towards the prismatic surface by means of electrophoresis.

Electrophoretic display devices are based on the movement of charged, usually colored particles under the influence of an electric field between two extreme states having a different transmissivity or reflectivity. With these devices, dark (colored) characters can be imaged on a light (colored) background, and vice versa.

Electrophoretic display devices are therefore notably used in display devices taking over the function of paper, referred to as "white paper" applications (electronic newspapers, electronic diaries).

The present invention is based on a completely different mechanism for realizing the differences in reflected light in the two (dark and light) optical states.

To this end, a display device according to the invention comprises a reservoir at the location of a pixel, which reservoir contains at least two substantially immiscible fluids having a different refractive index or a different absorption coefficient, and a difference of electric conductivity, said display device also comprising drive means for displacing the fluids with respect to each other.

As will be explained hereinafter, the light is completely reflected in one of the two states, (by suitable choice of one of the fluids and hence the refractive index), while the light is absorbed by the fluid in the other state (or either or not partly transmitted and absorbed elsewhere).

The substrate surface facing the viewer on the viewing side may be flat, with at least a part of the prismatic surface of the substrate forming part of a wall of the reservoir. Alternatively, it may be prismatic, with at least a part of the flat surface of the substrate forming part of a wall of the reservoir.

In order to displace the fluids with respect to each other, use is made of the difference of electric conductance and, at the area of the wall of the reservoir of a pixel, the drive means comprise at least two electrodes which can be electrically coupled to the fluids.

At the area of the wall of the reservoir of a pixel, the drive means preferably comprise two electrodes which are isolated from the fluids, and a third electrode which is in electric contact with the electrically conducting fluid.

To this end, a matrix device comprises a plurality of pixels at the area of crossings of row or selection electrodes and column or data electrodes, with at least a switching element between an electrode of the pixel and a row or column electrode.

These and other aspects of the invention are apparent from and will be elucidated with reference to the embodiments described hereinafter.

Figure 1B:
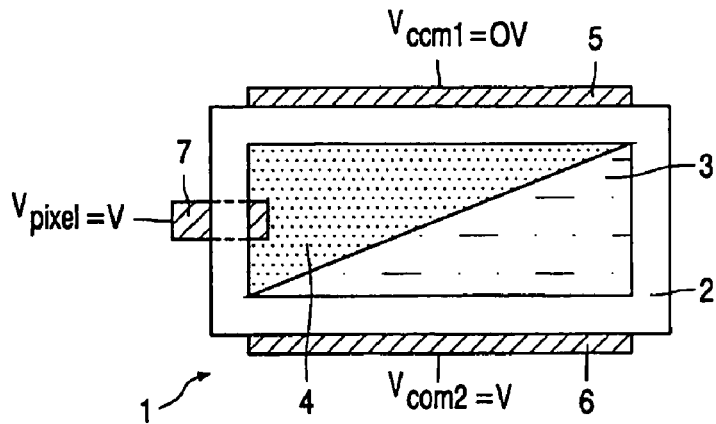
Figure 2:
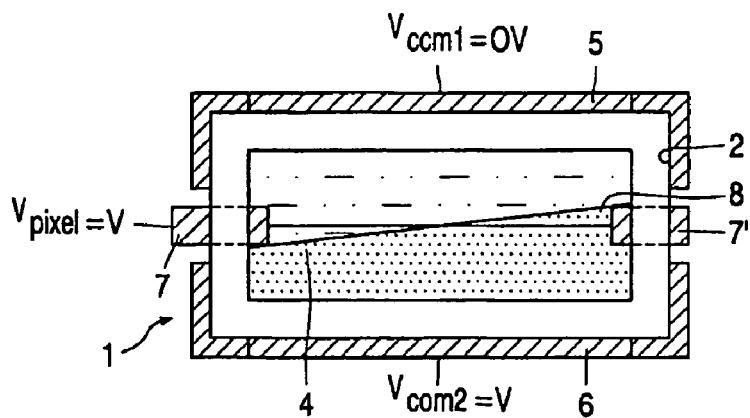
Figure 3A:
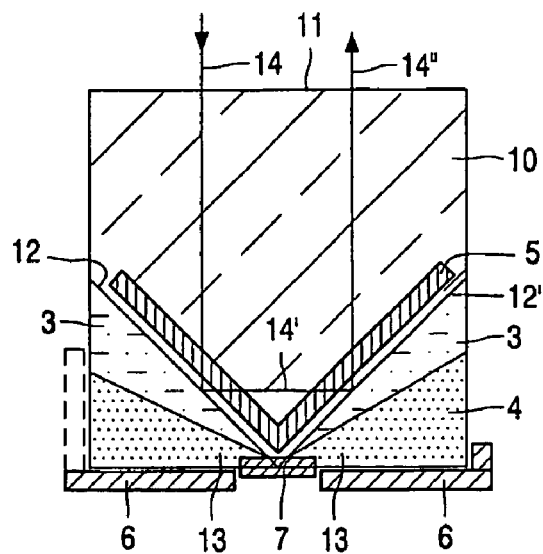
Figure 3B:
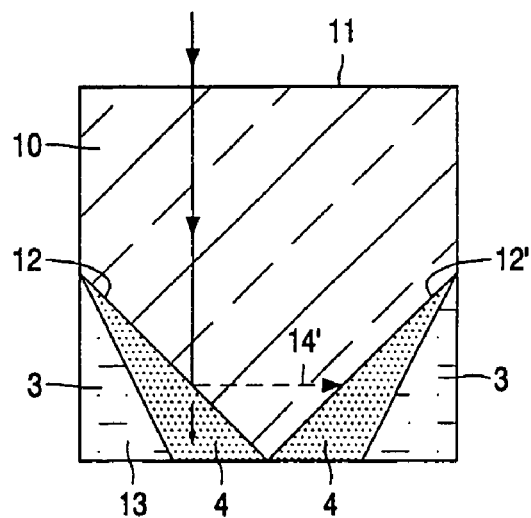
Figure 4:
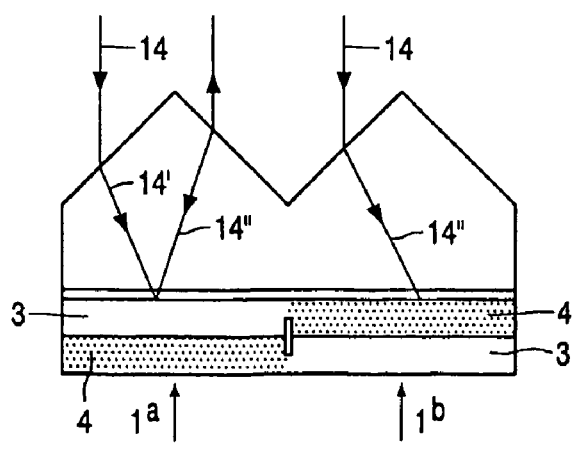
Figure 5:
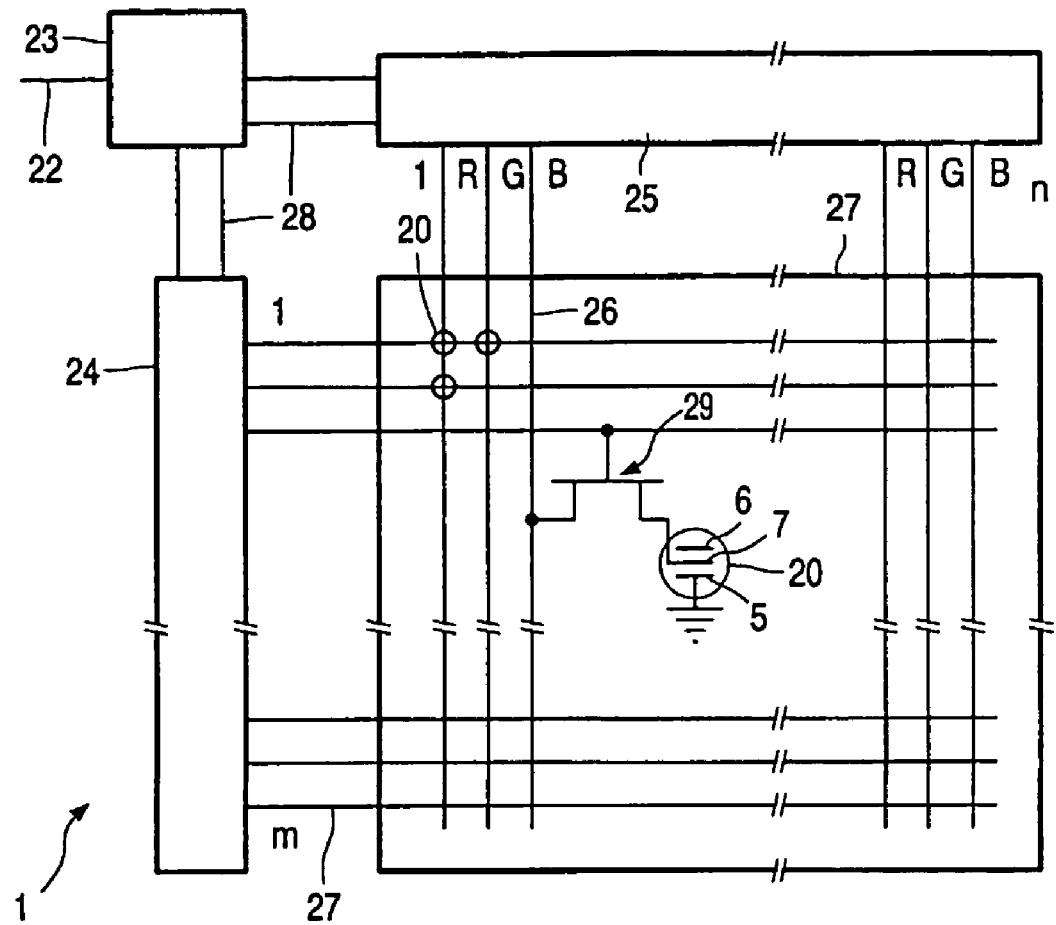

In the drawings:

FIG. 1 shows diagrammatically the principle on which a display device according to the invention is based, FIG. 2 shows a variant of FIG. 1, FIG. 3 shows a possible form of a display cell according to the invention, while FIG. 4 shows another possible form of a display cell according to the invention, and FIG. 5 is an electric equivalent diagram of a display device according to the invention.

The Figures are diagrammatic and not drawn to scale; corresponding components are generally denoted by the same reference numerals.

FIG. 1 shows diagrammatically a display cell 1 with two liquids, or fluids, 3, 4 in a transparent, for example, glass or synthetic material envelope 2, which fluids do not mix with each other and one of which is electrically conducting and the other is insulating. In this example, the display cell 1 comprises, for example an aqueous (color) solution 4 (electrically conducting), for example, a solution in water of methylene blue or Prussian blue ($C_6Fe_2Kn_6$), while a gas such as nitrogen or a non-polar oil such as an alcane (for example, dodecane or hexadecane), a silicon oil, chloronaphtalene, bromonaphtalene, or 1-bromododecane is chosen as an insulating fluid.

On two sides of the fluids, the display cell 1 comprises insulated electrodes 5, 6 which are usually fed with voltages $V_{com1}$, $V_{com2}$ which are common for a plurality of pixels, in the relevant example with voltages of 0 and V. The display cell 1 also comprises an electrode 7 which makes electrically conducting contact through the envelope 2 with the electrically conducting fluid 4. The electrode 7 is fed with a voltage $V_{pixel}$ by means of which the optical state of the display cell is adjusted. Although, for the sake of understanding the invention, the electrodes 5, 6 are shown outside the envelope, they are provided within the envelope 2 in practice and insulated from the fluids by means of an insulating coating having a low wetting hysteresis such as a fluoropolymer.

The electrically conducting fluid 4 is attracted by electrostatic forces in the direction of the electrodes 5, 6, namely towards the electrode 5 with a force which is proportional to $(V_{pixel}-V_{com1})^2$ and towards the electrode 6 with a force which is proportional to $(V_{pixel}-V_{com2})^2$ due to electrowetting or electrocapillarity. The difference between the respective electrostatic forces defines the position of the fluid 4 in a display cell. In FIG. 1, $V_{com1}=0$ and $V_{com2}=V$. When $V_{pixel}=0$, the electrically conducting fluid 4 is at the location of electrode 6 (FIG. 1a), while the electrically conducting fluid 4 is at the location of electrode 5 (FIG. 1b) when $V_{pixel}=V$. By changing the pixel potential $V_{pixel}$, the location of the electrically conducting fluid 4 can thus be influenced. Although the electrode 7 is shown as a conducting electrode in this example, and, moreover, projects into the fluid, this is not necessary. The potential may also be provided on the conducting fluid via capacitive coupling. In that case, the electrode 7 is arranged, for example, outside the reservoir 2 or provided with an insulating protective coating.

FIG. 2 shows a variant of FIG. 1, in which the electrode 7, which is again fed with a voltage $V_{pixel}$ is subdivided into two sub-electrodes 7, 7'. The interface between the fluids is now substantially parallel to the upper and lower wall of the envelope 2, with a small deviation in the plane of the drawing, due to the effect used (in FIG. 2, this is shown diagrammatically by means of the slanting line 8).

FIG. 3 shows how the principle described above is used in a display device based on total internal reflection. A display cell 1 comprises a transparent substrate 10 of glass or a synthetic material, having a substantially flat surface 11 and a substantially prismatic surface 12, 12' opposite said flat surface. The display cell comprises a reservoir 13 which contains at least two immiscible fluids 3, 4 having a different refractive index, which fluids do not mix with each other and one of which is an electrically conducting fluid and the other is an insulating fluid. The display cell 1 also comprises an electrode 7 which is fed with a voltage $V_{pixel}$ and makes electrically conducting contact through the envelope (not shown) with the electrically conducting fluid 4. Although this is not shown in FIG. 3, it is favorable if the display cells have a common overflow reservoir for the two fluids (either or not for a plurality of display cells) in connection with expansion upon temperature changes etc. The display cell comprises insulated electrodes 5, 6 on two sides of the fluids, which electrodes are fed with common voltages $V_{com1}$, $V_{com2}$, in the relevant example with voltages 0 and V.

When $V_{pixel}=0$, the electrically conducting fluid 4 is at the location of electrode 6 (FIG. 3*a*), while the electrically conducting fluid 4 is at the location of electrode 5 (FIG. 3*b*, in which the electrodes are not shown) when $V_{pixel}=V$. An incident light ray 14 is transmitted in the first mentioned case (FIG. 3*a*) by the transparent (ITO) electrode 5 and undergoes total reflection on the surface 12 by suitably choice of the refractive index of the insulating fluid. The reflected light ray 14' once more undergoes total reflection on the surface 12' and the twice reflected light ray 14" leaves the display cell 1 substantially without any loss of light. In the second case (FIG. 3*b*), the incident light ray 14 is also transmitted by the transparent (ITO) electrode 5, but is subsequently absorbed entirely or partly on the surface 12 by the aqueous solution 4. A possibly reflected part 14' of the light ray 14 is absorbed on the surface 12'.

In this example, the electrode 6 is only shown on the lower side of the pixel because this is favorable when combining several pixels on one substrate, for example, in a matrix display device. In other cases, it is advantageous to provide the electrode 6 also along the wall of the reservoir 13. This is shown diagrammatically by means of broken lines in FIG. 3*a*.

FIG. 4 shows diagrammatically a combination of two similar pixels with reservoirs as described with reference to FIG. 2, but now with a substantially flat surface 11 on the side of the pixel and a substantially prismatic surface 12, 12' on the viewing side. Otherwise, the reference numerals have the same significance as in the previous Figures.

FIG. 5 shows an electrical equivalent of a part of a color display device 1 to which the invention is applicable. It comprises a matrix of pixels 20 at the area of crossings of row or selection electrodes 27 and column or data electrodes 26. The row electrodes 1 to m are consecutively selected by means of a row driver 24, while the column electrodes 1 to n are provided with data via a data register 25. The pixels in columns 1, 4, 7, . . . , n−2 constitute red pixels in this example, the pixels in columns 2, 5, 8, . . . , n−1 constitute blue pixels in this example, and the pixels in columns 3, 6, 9, . . . , n constitute green pixels. To this end, incoming data 22 are first processed, if necessary, in a processor 23. Mutual synchronization between the row driver 24 and the data register 25 takes place via drive lines 28.

Drive signals from the row driver 24 and the data register 25 select a pixel 20 via thin-film transistors (TFTs) 29 whose gate electrodes are electrically connected to the row electrodes 27 and whose source electrodes are electrically connected to the column electrodes 26 (referred to as active drive). The signal at the column electrode 26 is transferred via the TFT to an electrode 7 of a pixel 20 coupled to the drain electrode. The electrode 7 has the same function as described above with reference to FIGS. 1 to 4. The other electrodes 5, 6 of the pixel 20 are connected, for example, to one (or more) common electrode or electrodes with $V_{com1}$ (in this example, ground) and $V_{com2}$ (in this example, V). In the example of FIG. 5, such a TFT 29 is shown diagrammatically for only one pixel 20.

Several variations are of course possible within the scope of the invention. For example, use may be made of two immiscible fluids having a different refractive index. In certain electrode configurations, it is possible that the incident beam reaches the lower side of the pixel. If desired, the pixel may be provided with a light-absorbing layer on the lower side.

Instead of the thin-film transistors (TFTs) 29, other switching elements may be chosen, for example, a diode circuit.

The third electrode 5 may also be omitted, provided that the fluids 3, 4 used have such a difference of hydrophobic properties that the described displacement occurs (the walls have a difference of wetting behavior). One of the two electrodes then functions as a drive electrode.

As stated, use may also be made of capacitive coupling; this also applies to driving of the electrodes by means of the TFTs or other switching elements.

The protective scope of the invention is not limited to the embodiments described.

The invention resides in each and every novel characteristic feature and each and every combination of characteristic features. Reference numerals in the claims do not limit their protective scope. Use of the verb "comprise" and its conjugations does not exclude the presence of elements other than those stated in the claims. Use of the article "a" or "an" preceding an element does not exclude the presence of a plurality of such elements.

What is claimed is:

1. A display device comprising a substantially transparent substrate having a substantially flat surface and a substantially prismatic surface facing said flat surface, said display device comprising a reservoir at the location of a pixel, which reservoir contains at least two substantially immiscible fluids having a different refractive index or a different absorption coefficient, and a difference of electric conductivity, said display device also comprising drive means for displacing the fluids with respect to each other.

2. A display device as claimed in claim 1, comprising two immiscible fluids having a different refractive index, one of which is electrically conducting and one is substantially insulating.

3. A display device as claimed in claim 1, with the flat surface of the substrate on the viewing side, wherein at least a part of the prismatic surface of the substrate forms part of a wall of the reservoir.

4. A display device as claimed in claim 1, with the prismatic surface of the substrate on the viewing side, wherein at least a part of the flat surface of the substrate forms part of a wall of the reservoir.

5. A display device as claimed in claim 1, wherein the drive means at the area of the wall of the reservoir of a pixel comprise at least two electrodes which can be electrically coupled to the fluids.

6. A display device as claimed in claim 5, wherein the drive means at the area of the wall of the reservoir of a pixel comprise two electrodes which are isolated from the fluids, and a third electrode which is in electric contact with the electrically conducting fluid.

7. A display device as claimed in claim 1, comprising a plurality of pixels at the area of crossings of row or selection electrodes and column or data electrodes, with at least a switching element between an electrode of the pixel and a row or column electrode.

8. A display device as claimed in claim 7, with a TFT transistor per pixel between the electrode and a column electrode, wherein the gate of the TFT transistor is connected to a row electrode.

9. The display device of claim 1, wherein a first one of the two immiscible fluids has a refractive index substantially different from a refractive index of the substrate, and wherein the display device is operative in a first state to reflect light when the first fluid is displaced within the reservoir to be adjacent to the substantially transparent substrate, and wherein the display device is operative in a second state to absorb light when the second fluid is displaced within the reservoir to be adjacent to the substantially transparent substrate.

10. The display device of claim 9, wherein the device is operable to receive the light at the substantially flat surface of the substrate, and wherein the light is reflected at the substantially prismatic surface of the substrate to exit the substrate at the substantially flat surface.

11. The display device of claim 9, wherein the device is operable to receive the light at the substantially prismatic surface of the substrate, and wherein the light is reflected at the substantially flat surface of the substrate to exit the substrate at the substantially prismatic surface.

12. The display device of claim 9, wherein the first liquid is an insulating fluid.

13. The display device of claim 1, wherein the drive means includes two electrodes physically insulated from the two substantially immiscible fluids.

14. A display device comprising:
a substantially transparent substrate having a substantially flat first surface and a substantially prismatic second surface opposite said first surface;
a plurality of row electrodes extending in parallel across the substrate in a first direction;
a plurality of column electrodes extending in parallel across the substrate in a second direction; and
a plurality of pixels arranged in a matrix at areas where the row electrodes cross the column electrodes,
wherein each pixel comprises:
a reservoir containing two substantially immiscible fluids having a different refractive index or a different absorption coefficient with respect to each other, and a difference of electric conductivity with respect to each other, and
means for selectively displacing the two fluids with respect to each other, wherein in a first arrangement of the fluids light received by the pixel is substantially reflected by the pixel, and in a second arrangement of the fluids light received by the pixel is substantially absorbed by the pixel.

15. The device of claim 14, wherein the means for selectively displacing the two fluids with respect to each other includes two electrodes adapted to provide a voltage potential across at least one of the fluids.

16. The device of claim 14, wherein the means for selectively displacing the two fluids with respect to each other includes two electrodes which are isolated from the fluids, and a third electrode which is in electric contact with the electrically conducting fluid.

17. The device of claim 16, wherein each pixel further comprises a transistor having a gate connected to a corresponding one of the row electrodes, having a first terminal connected to a corresponding one of the column electrodes, and having a second terminal connected to the third electrode of the means for selectively displacing the two fluids with respect to each other.

18. The device of claim 14, wherein at least a part of the prismatic surface of the substrate forms part of a wall of the reservoir.

19. The device of claim 14, wherein at least a part of the flat surface of the substrate forms part of a wall of the reservoir.

20. The device of claim 14, wherein a first one of the two immiscible fluids has a refractive index substantially different from a refractive index of the substrate, and wherein in the first arrangement the first fluid is displaced within the reservoir to be adjacent to the substantially transparent substrate, and wherein in the second arrangement the second fluid is displaced within the reservoir to be adjacent to the substantially transparent substrate.

* * * * *